Dec. 1, 1970  A. L. RICHARD  3,543,311

FOLDABLE PORTABLE SHELF FOR VEHICLES

Filed Nov. 22, 1968  2 Sheets-Sheet 1

INVENTOR.
ASHTON L. RICHARD
BY William R. Piper
ATTORNEY

Dec. 1, 1970     A. L. RICHARD     3,543,311
FOLDABLE PORTABLE SHELF FOR VEHICLES
Filed Nov. 22, 1968     2 Sheets-Sheet 2
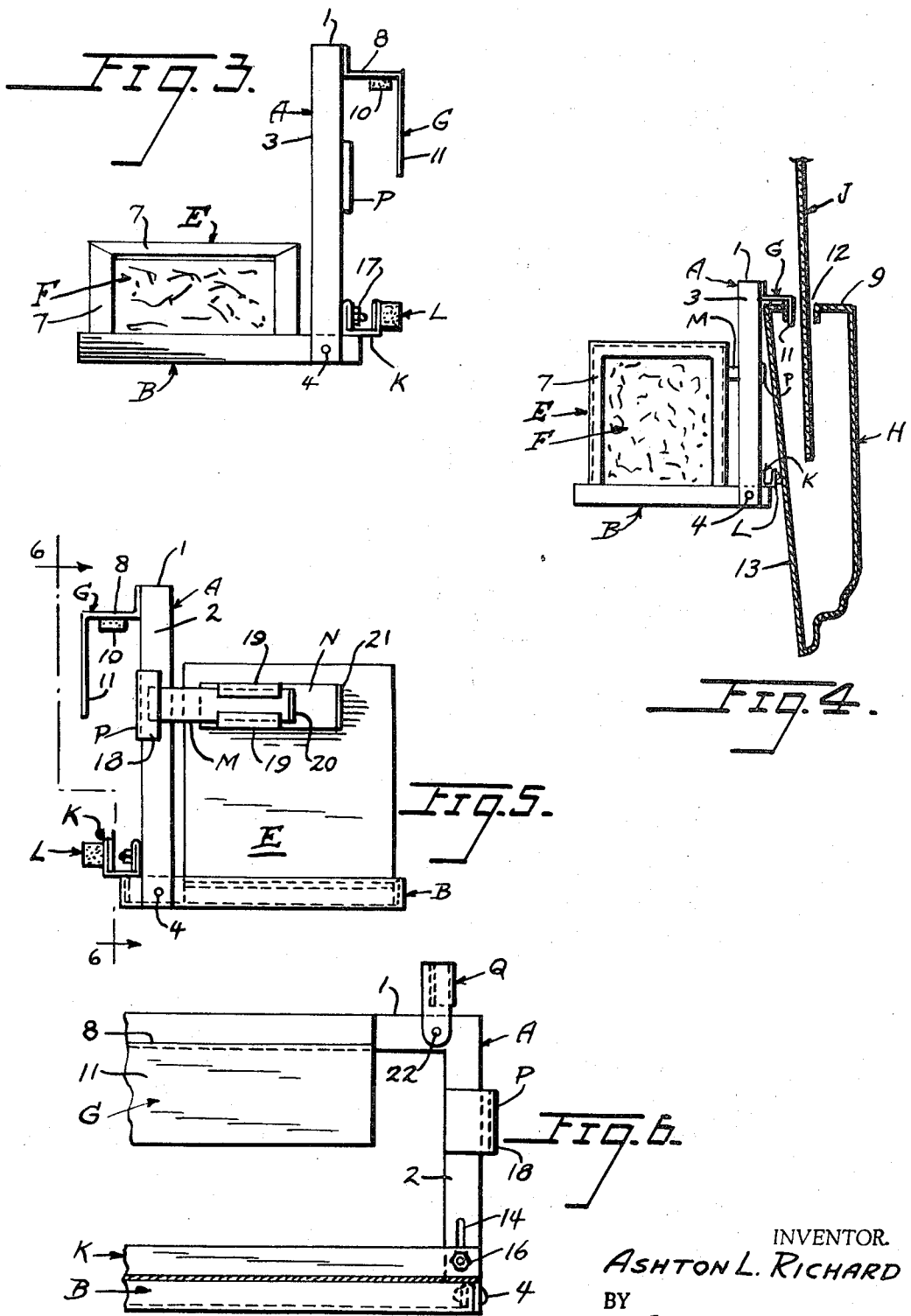
INVENTOR.
ASHTON L. RICHARD
BY
William R. Piper
ATTORNEY

United States Patent Office 3,543,311
Patented Dec. 1, 1970

3,543,311
FOLDABLE PORTABLE SHELF FOR VEHICLES
Ashton L. Richard, 976 Torrano Ave., Apt. 1,
Hayward, Calif. 94542
Filed Nov. 22, 1968, Ser. No. 778,181
Int. Cl. B60r 11/00
U.S. Cl. 5—118
8 Claims

ABSTRACT OF THE DISCLOSURE

A foldable portable shelf for a vehicle that has a hook for engaging with the window sill on the inner side of a vehicle door and has a frame that extends downwardly from the hook for supporting the shelf a predetermined distance below the window sill. The shelf can be swung from a horizontal position into an inoperative one where it will be received within the frame. A hinged extension is carried by the shelf and can be swung into an upright or forwardly inclined position when the shelf is in a horizontal plane. The shelf can be used as a service tray or for supporting a pet animal. The device may be folded and removed from the vehicle door.

BACKGROUND OF THE INVENTION

Field of the invention

Many people have domestic pets such as a dog or a cat that they would like to take with them when riding in a vehicle. In order to keep the animal from sitting on a person's lap, I have provided a portable shelf that can be supported on the inside of the vehicle door by using a hook that hangs on the window sill of the door and whose end extends down into the window cavity that receives the glass. The glass can be raised or lowered without disturbing the hook. The shelf, when in a horizontal position, is spaced below the window sill so that the animal can sit on the shelf and be in a position where he can see out through the window. Additional shelf area is provided by a hinged extension that can be swung into forwardly and upwardly inclined position. For small animals, the extension can be secured in a vertical position and will act as a barrier to prevent the animal from lurching forward and falling off from the shelf when the moving vehicle is brought to a stop.

Description of the prior art

The patent to Bernard M. Offutt, No. 2,101,686, issued on Dec. 7, 1937, discloses a service tray that has hooks for supporting it on the window sill of a vehicle door. The hooks support the tray a predetermined distance below the window sill and when the tray is removed the hooks can be swung to lie substantially in the same plane as that of the tray. The patent does not show a frame that hangs downwardly on the inside of a vehicle door and supporting a shelf in a horizontal position. The shelf can be swung into an inoperative position so as to be enclosed in the frame. Also the patent does not show a hinged extension pivotally supported by the shelf at the front end thereof and swingable either into an upright or forwardly inclined position.

SUMMARY OF THE INVENTION

An object of the invention is to provide a foldable portable shelf for a vehicle in which the frame performs two functions. It will support the shelf at a predetermined distance below the window sill of the vehicle door and it will act as a casing for enclosing the shelf when the latter is swung into an inoperative position. A swingable extension is pivotally secured to the front end of the shelf and it can be swung from an inoperative position where it parallels the plane of the shelf into either a vertical or a forwardly and upwardly inclined position. Novel means is used for adjusting the frame and shelf with respect to the inclination of the inner wall of the vehicle door to which the device is attached so as to cause the frame to lie in a vertical plane and the shelf to lie in a horizontal plane when the shelf is used and this arrangement being possible regardless of the inclination of the vehicle door inner wall to the vertical plane.

BRIEF DESCRIPTION OF THE DRAWINGS

FIG. 3 is an end view of FIG. 1 when looking from the right hand end of this figure. The shelf-engaging catches are not shown.

FIG. 4 is an end view similar to FIG. 3, except that the swingable extension is shown in a vertical position and the device is shown supported by the window sill of a vehicle door. The shelf-engaging catches are not shown.

FIG. 5 is an end view of FIG. 1 when looking from the left hand end of this figure and shows the swingable extension in a vertical position similar to that of FIG. 4 and illustrates the locking mechanism for holding the extension in a vertical plane. The shelf-engaging catches are not shown.

FIG. 6 is a partial rear view of the device, a portion being shown in section and is taken along the line 6—6 of FIG. 5. The shelf-engaging catch is shown in shelf-releasing position.

DESCRIPTION OF THE PREFERRED EMBODIMENT

Figure 1:
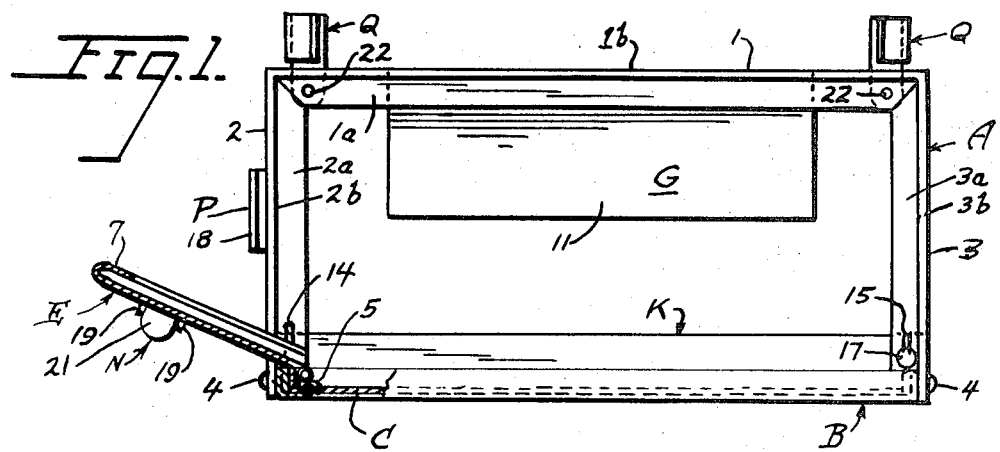
FIG. 1 is a front elevation of the device shown in operative position with the shelf-engaging catches shown in shelf-releasing positions.

In carrying out my invention, I provide a frame indicated generally at A in all six figures. The frame is preferably formed from an angle iron that is bent to form a top member 1 and two side members 2 and 3. The frame A is U-shaped with the portions 1a, 2a and 3a of the top 1 and side members 2a and 3a lying in the same plane, and the portions 1b, 2b and 3b being of double thickness and presenting a rounded edge to the frame. The portions 1b, 2b and 3b constitute flanges for the three sides of the frame.

The side flanges 2b and 3b of the frame A have their ends extending beyond the ends of the side portions 2a and 3a and the ends of the side flanges are pivotally connected at 4—4 to a shelf indicated generally at B. The shelf comprises an angle iron that is bent into a rectangular form and the portions of the angle iron that lie in a common plane will support a base plate C, see FIGS. 1 and 2, that is welded or otherwise secured to these portions. Note the sectioned portion of the angle iron that forms the perimeter of the shelf. The part of the angle iron that forms the retaining flange for the shelf is bent back on itself to provide a rounded edge for the flange. The rear edge of the shelf B extends beyond the frame A, see FIG. 3 for a purpose that will be described later. The base plate C may support a piece of carpet D, see FIG. 2 that is of the same size and shape as the shelf B, and the carpet is held in place by the flanged sides of the shelf. The carpet may be used when the shelf supports a domestic animal such as a dog or a cat.

Figure 2:
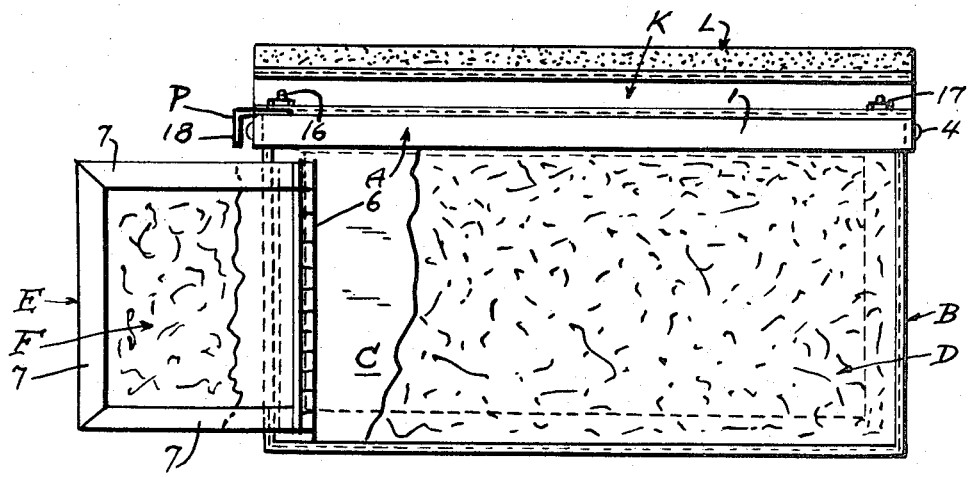
FIG. 2 is a top plan view of FIG. 1, with the shelf-engaging catches and the supporting hook not shown so that the other parts of the device will be seen.

The forward end of the shelf B, which is the left hand end of FIGS. 1 and 2, has an angle iron piece 5 welded or otherwise secured to the base plate C. A piano hinge 6 is attached to the angle iron 5 and pivotally connects a swingable extension E to the shelf. The extension E when in folded or inoperative position, lies flat and parallel to the plane of the shelf B. The extension E can be swung into an extended position as shown in FIGS. 1 and 2 and will rest on the adjacent portion of the flange that constitutes the perimeter of the shelf. The upper edge of the flange is high enough with relation to the pivotal axis of the piano hinge 6, to incline the extension E upwardly at a slight angle of about 20° with respect to the plane of the shelf B. Three of the edges of the extension E are bent back upon themselves to form retaining flanges 7 for another carpet piece F that is held in place by these flanges, see FIG. 2. When the extension E is in its forwardly inclined position, it provides additional supporting surface for a large dog to place his front paws on this extension and to brace himself during the stopping of the forward movement of the vehicle. The width of the extension E is less than the width of the shelf B.

The top member 1 of the frame A, has a hook-shaped piece of metal G welded thereto, see FIGS. 1, 3 and 4. The hook G has a horizontal portion 8 adapted to overlie the inner portion of the window sill 9 of a vehicle door indicated generally at H. A strip of foam rubber 10 underlies the horizontal portion of the hook G and contacts the window sill 9 so as not to scratch it. The hook has a downwardly extending portion 11 that is received in a part of the slot 12 in the vehicle door H that also receives the window glass J for the door. The hook G will not interfere with the raising and lowering of the window.

FIG. 4 shows the inner wall 13 of the vehicle door extending at an angle from a vertical plane that parallels the plane of the frame A when the latter is supported by the door. I provide novel means for maintaining the frame A in a substantially vertical position regardless of the inclination of the interior wall 13 of the vehicle door H. In FIGS. 1 to 4 inclusive, I show a channel-shaped member K that extends from the front member 2 of the frame A to the rear member 3. The portions 2a and 3a of these members have slots 14 and 15, respectively, that receive bolts 16 and 17, see FIG. 2. The bolts are passed through openings in the channel member K, and may be tightened for securing the channel in adjusted position along the frame members 2 and 3. The outer side of the channel K has a strip of sponge rubber L that will bear against the inner wall 13 of the vehicle door G, when the device is mounted on the door. If the frame A does not parallel a vertical plane when the device is in operative position on the door, the channel K may be adjusted vertically on the frame sides 2 and 3 so as to accommodate the particular angle of the door inner wall 13, and the rubber strip L will contact with this wall and hold the frame A in the proper vertical position. This is done by loosening the bolts 16 and 17 and sliding them along the slots 14 and 15 to the desired position and then tightening them for securing the channel K, in its new position. The channel K acts as a spacing member between the vehicle door and the shelf, and can be adjusted for keeping the shelf horizontal.

The shelf B is held in substantially horizontal position by the rear edge thereof coming into contact with the underside of the channel K which acts as a stop, see FIGS. 3, 4 and 5. The slight vertical adjustment of the channel K on the frame A as explained in the preceding paragraph for causing the frame to hang in a vertical plane, will have little effect in altering the angle made between the frame and the opened shelf B from that of a right angle.

In certain instances, the operator may wish to swing the extension E into a vertical position with respect to the open shelf B. In FIGS. 4 and 5, I show the extension E extending at right angles to the shelf. I further show locking means for securing the extension in this upright position. The extension E has a slidable bolt M which slides in a guide N that is secured to the extension, see FIG. 5. The frame A has a keeper P that is secured to the front member 2 of the frame. The keeper has a flange 18 that is spaced from the adjacent side of the frame member 2. The guide N has inwardly turned flanges 19 for slidably supporting the bolt M. The bolt in turn has a turned out handle 20 by means of which the bolt may be moved so that its end will enter the space between the frame side 2 and the keeper flange 18. This will secure the extension in an upright position. The bolt M can be retracted for freeing the extension E from the keeper P. The guide N has a turned out portion 21 that acts as a stop for limiting the sliding movement of the bolt M to the right in FIG. 5.

It is possible to fold the shelf B and the extension E within the confined area of the frame A when it is desired not to use the shelf. First the extension E is swung down into a parallel arrangement with the shelf B, and then the shelf is swung upwardly about its pivots 4—4 until it is received within the frame A. The distance from the pivot 4 in FIG. 3 to the left hand side of the shelf B is less then the distance from the same pivot point to the inner side of the top member 1 of the frame A. The length of the shelf B is received within the inner surfaces of the front member 2 and the rear member 3 of the frame A and therefore the shelf can be nested within the frame when the shelf is swung upwardly about its pivots 4—4. The frame has two U-shaped catches Q, see FIG. 1, that are pivoted to the frame at 22 and can be swung from open position to a closed one so that the catches will receive the shelf edge for preventing the accidental swinging of the shelf into open position. The device can be left hanging on the vehicle door G, in close position or it may be removed and stored.

I claim:
1. A device of the type described comprising:
   (a) a substantially rectangular frame having a hook for suspending the frame from the window sill of a vehicle door, the frame being supported in substantially a vertical plane;
   (b) a shelf pivotally carried by said frame and being swingable from a position substantially enclosed within said frame into a position extending substantially at right angles to the plane of the frame; and
   (c) a spacing member adjustably carried by said frame at a point below said hook and adapted to contact with the adjacent surface of the inner wall of the vehicle door for cooperating with the hook for holding said shelf in a substantially horizontal plane.
2. The combination as set forth in claim 1 and in which:
   (a) said spacing member is elongated and lies in substantially a horizontal position when the frame is supported by said hook; and
   (b) said shelf having a portion which is swung up under said spacing member to contact therewith when said shelf is swung from an inoperative position where it is substantially housed within said frame into an operative position where the shelf extends substantially at right angles to said frame, said shelf portion and said spacing member preventing any further swinging movement of said shelf beyond its operative position;
   (c) whereby said spacing member fulfills the added function of acting as a stop for said shelf portion when said shelf is in operative position.
3. The combination as set forth in claim 2 and in which:

(a) an extension of less width than the width of said shelf is hinged to said shelf at one end thereof and is swingable from a closed position where it parallels the plane of the shelf into an open position where it extends beyond the adjacent end of the shelf.

4. The combination as set forth in claim 3 and in which:
   (a) said extension can be swung into a position at right angles to the plane of the shelf; and
   (b) means for removably securing said extension to said frame for holding said extension at right angles to the plane of said shelf.

5. The combination as set forth in claim 1 and in which:
   (a) an extension is hinged to said shelf at one end thereof and is swingable from a closed position where it parallels the plane of the shelf into an open position where it extends beyond the adjacent end of the shelf.

6. The combination as set forth in claim 5 and in which:
   (a) a pad overlies the upper surface of said shelf when the latter is in open or operative position; and
   (b) a second pad overlies the upper surface of said extension when the latter is in open or extended position.

7. In combination:
   (a) a U-shaped frame formed from an angle iron bent so at to provide a top member and front and rear members that hang downwardly from the top member;
   (b) a rectangular-shaped shelf having its ends pivotally supported by said front and rear members of said frame so that one side of said shelf will be disposed much nearer to said pivotal supports than the other side and the shelf can be swung from an inoperative position where it is substantially housed within said frame into an operative position where the plane of said shelf extends substantially at right angles to the plane of said frame and the first mentioned side of said shelf extends a short distance to one side of the plane of the frame;
   (c) an elongated spacing member carried by said front and rear members of said frame and further acting as a stop for preventing any farther swinging movement of said shelf when the latter is swung from an inoperative position into an operative position where the first mentioned side of the shelf contacts with the underside of said spacing member; and
   (d) a hook on said frame for supporting it on the window sill of a vehicle door, said spacing member contacting the door for holding said frame in a substantially vertical position, so that said shelf is disposed in a substantially horizontal position.

8. The combination as set forth in claim 7 and in which:
   (a) said spacing member is adjustable along the front and rear frame members for accommodating any inclination of the inner side of the vehicle door against which said spacing member contacts.

References Cited

UNITED STATES PATENTS

| | | | |
|---|---|---|---|
| 1,964,500 | 6/1934 | Breiding et al. | 108—46 |
| 2,593,222 | 4/1952 | Tracy | 108—46 XR |

FOREIGN PATENTS

| | | |
|---|---|---|
| 648,216 | 9/1962 | Canada. |

GERALD M. FORLENZA, Primary Examiner

U.S. Cl. X.R.

108—46; 224—42.44